UNITED STATES PATENT OFFICE.

DMITRY ALEXANDROWITCH PÉNIAKOFF, OF BRUSSELS, BELGIUM.

PROCESS OF PURIFYING ALUMINOUS ORES.

SPECIFICATION forming part of Letters Patent No. 695,762, dated March 18, 1902.

Application filed November 17, 1900. Serial No. 36,884. (No specimens.)

*To all whom it may concern:*

Be it known that I, DMITRY ALEXANDROWITCH PÉNIAKOFF, of 22 Rue des Palais, Brussels, Belgium, have invented certain Improvements in the Art of Treating Ferro-Aluminous Ores, of which the following is a specification.

The separation of the iron from the alumina contained in bauxite by means of acids is a problem that has not hitherto been satisfactorily solved, as the oxid of iron and the oxid of aluminium behave alike in the presence of most acids, both oxids being dissolved simultaneously, and the difficulty of separating them when in this state becomes still greater, for with the exception of a few costly reagents the agents which precipitate either of the metals will precipitate the other at the same time. I have found that the conditions are no longer the same if the alumina is in the presence of iron sulfid instead of iron oxid, for these sulfids can then be transformed into soluble salts without the alumina being attacked. I therefore by a preliminary treatment transform iron aluminium ores into compounds containing iron only in the form of sulfids. To effect this, I subject the crushed iron alumina ores to the action of sulfurizing-gases, such as hydrogen sulfid, the iron in the ore being completely transformed into sulfid of iron and water being simultaneously formed. This transformation into sulfids takes place at the ordinary temperature, as well as at a higher one. The operation may be advantageously carried out in a series of air-tight receptacles made of iron, lead, wood, masonry, or the like and connected together by pipes arranged in such a manner that the sulfurizing-gases pass successively from one receptacle to the other, and in so doing traverse the ore to be treated until the gas is absorbed. While the reaction is gradually proceeding the materials under treatment turn black and this serves as a guide to ascertain the progress of the reaction. In the majority of cases the sulfurization will be complete in one of the receptacles when the change of colors is perceptible in the succeeding receptacles. The reaction is so intense that once the gas has driven the air out of the apparatus a vacuum is formed therein despite the abundant gas-supply. The receptacle in which the sulfurization is completed is isolated from the group (which can be done by suitably-arranged cocks) and replaced by another containing a fresh charge of ore. The flow of sulfurizing-gas will then be directed into the next receptacle in which the sulfurization has reached the most advanced stage. The operation is thus carried on in a continuous and methodical manner. The ore the iron oxid of which has thus been sulfurized is then subjected to the action of an acid, such as sulfuric acid, sulfurous acid, hydrochloric acid, or the like. These acids attack the sulfids of iron formed in the aforesaid manner and transform them into soluble salts of a kind in accordance with the acid used while hydrogen sulfid is evolved, which may be recovered and used for further sulfurizations. A slight deposit of sulfur may take place. In case the previously-sulfurized ore is treated by sulfurous acid hyposulfite of iron is produced without evolution of hydrogen sulfid. In this case almost the whole of the sulfur present in both operations may be advantageously recovered in the form of alkaline hyposulfite, which has a great industrial value. For this purpose the solution of the hyposulfite of iron extracted from the ore by washing it is treated with an alkali, (hydrates, carbonates, or sulfids.) The iron will thus be precipitated in the form of oxids, carbonates, or sulfids, while the alkaline hyposulfite remains in solution to be concentrated and crystallized. The alumina is not attacked by the acids as long as there is iron sulfid present. Even if a part of the alumina were simultaneously attacked by the acid it would be precipitated by the sulfid of iron, for the salt of aluminium which is formed would, like the acid itself, act on the sulfid of iron that is present. The action of the acids may be caused to take place in the apparatus wherein the sulfurization took place, or it may be caused to take place in other apparatus. The solution of the iron salt is afterward separated by a methodical washing for the purpose of crystallizing it, and the residue is washed until all traces of iron have disappeared. During this washing the free sulfur that may have deposited in the course of the previous operations is carried away. The residue of this operation contains the whole of the alumina of the original ore, but no more iron. This residue may be utilized for the direct manufacture of aluminium salt free from iron, for, like alumina itself, it is soluble in concentrated acids. According to the proportion of silica and other inert matter which it contains the aluminium salt thus manufactured may or may not be filtered or decanted before its concentration. The residue of alumina thus obtained, deprived of its moisture by drying it in the air or in a drying-stove or by means of a centrifugal machine, can be put upon the market in that state.

Having now particularly described and ascertained the nature of my invention and in what manner the same is to be performed, I declare that what I claim is—

1. In the treatment of ferro-aluminous ores, such as bauxites, the process which consists in converting the iron compounds therein into sulfids and then extracting the iron sulfid thus formed with an acid capable of attacking the iron sulfid.

2. In the art of treatment of ferro-aluminous ores, the process which consists in subjecting such ores to a current of hydrogen sulfid and then extracting the iron by an acid capable of attacking the iron sulfid.

3. In the treatment of ferro-aluminous ores, the process which consists in converting the iron compounds contained therein into iron sulfid, then subjecting the resultant product to an acid which converts the sulfid into a soluble iron compound.

4. In the treatment of ferro-aluminous ores, the process which consists in converting the iron compounds contained therein into iron sulfid, then subjecting the resultant product to an acid which converts the sulfid into a soluble iron compound, and finally washing the mass thus obtained for the purpose of dissolving out the iron salt from the alumina.

5. The process which consists in treating a product containing aluminium and iron sulfid with an acid capable of converting the iron sulfid to a soluble iron compound.

6. The process of treating a sulfurized iron aluminium ore with sulfurous acid, substantially as set forth.

7. The process of treating a sulfurized iron aluminium compound with sulfurous acid, then dissolving out the resultant hyposulfite of iron and finally recovering the sulfur in the hyposulfite of iron by converting the latter into an alkaline hyposulfite.

8. The process of treating iron aluminous ores, which consists in first converting the iron compounds of the same into iron sulfid, then treating the resultant mass with sulfurous acid, then washing the same for the purpose of dissolving out the hyposulfite of iron.

9. The process of treating iron aluminous ores, which consists in first converting the iron compounds of the same into iron sulfid, then treating the resultant mass with sulfurous acid, then washing the same for the purpose of dissolving out the hyposulfite of iron, and, finally, recovering the sulfur introduced in the above reactions by converting the hyposulfite of iron into alkaline hyposulfites.

In testimony whereof I have signed my name to this specification in the presence of two subscribing witnesses.

DMITRY ALEXANDROWITCH PÉNIAKOFF.

Witnesses:
CHARLES DONY,
EDWARD P. MACLEAN.